United States Patent [19]

Biersach

[11] Patent Number: 4,945,334

[45] Date of Patent: Jul. 31, 1990

[54] ENERGIZING MEANS FOR ELECTRONIC WARNING APPARATUS

[75] Inventor: James E. Biersach, Mequon, Wis.

[73] Assignee: Alerting Communicators of America, Mequon, Wis.

[21] Appl. No.: 348,971

[22] Filed: May 8, 1989

[51] Int. Cl.[5] .......................... G08B 3/00; G01K 9/00

[52] U.S. Cl. .................................... 340/388; 340/390; 340/401; 340/404; 116/137 R; 116/142 R; 181/144; 381/89

[58] Field of Search ............... 340/388, 390, 401, 404; 381/89; 116/137 P, 137 A, 140, 142 P, 143; 181/148, 144, 157

[56] References Cited

U.S. PATENT DOCUMENTS 2,819,460 1/1958 Jacobs ................................ 340/388

3,517,390 6/1970 Whitehead .......................... 340/388

4,241,334 12/1980 Shintaky ............................ 340/388

4,344,504 8/1982 Howze ............................... 181/187

4,796,009 1/1989 Biersach ............................ 340/388

*Primary Examiner*—Donnie L. Crosland

*Attorney, Agent, or Firm*—Nilles & Nilles

[57] ABSTRACT

According to the invention, a high-powered community alerting and warning device comprising a number of electromagnetic drivers is energized for tone generation by means of a rotary alternator that produces, when driven at a predetermined rotational speed, a sine-wave a.c. in the 400–800 Hz range. The alternator output is applied directly to the drivers, eliminating costly amplifier modules and energizing the drivers for better efficiency and reliability than an amplifier system. The alternator can be the output of a rotary frequency converter, or it can be driven by an engine or a separate electric motor.

5 Claims, 2 Drawing Sheets

ENERGIZING MEANS FOR ELECTRONIC WARNING APPARATUS

FIELD OF THE INVENTION

This invention relates to a high-powered electronic outdoor alerting and warning apparatus for producing high volume siren tones, and the invention is more particularly concerned with means for so energizing the drivers of such apparatus as to operate them with better efficiency, increased output and longer useful lives than have been obtained with prior driver energizing means.

BACKGROUND OF THE INVENTION

The applicant's U.S. Pat. No. 4,796,009, issued Jan. 3, 1989, discloses one type of high-powered electronic warning apparatus to which the present invention is applicable; and another is disclosed in U.S. Pat. No. 4,344,504. In these and similar electronic devices, electrical energy is converted to accoustical energy by means of a number of identical electromagnetic drivers that cooperate with a horn or horns through which the sound energy produced by the drivers is beamed or distributed.

As compared with the earlier-developed electromechanical sirens, an electronic warning device has the advantage of being able to produce highly amplified voice outputs as well as tone outputs like those of an electromechanical siren. A more important consideration, however, is that an electronic device is capable of emitting an acoustic output that is horizontally beamed, to be audible at great distances from the apparatus, whereas a electromechanical siren inherently produces an output that disperses vertically. Thus, for warning apparatus of more than about 5 kW power input, the cost of an electronic tone-generating device is lower than that of an equally effective electromechanical device, and this cost differential increases with increasing input power. For this reason, electronic warning devices are now generally preferred over electromechanical devices where high-volume tone outputs are needed, even in the many cases where the voice capabilities of the electronic devices are not utilized.

Each of the drivers of an electronic warning device has a rigid housing comprising dome shaped front and rear castings that are coaxially secured to one another in clamping relationship to the rim of a diaphragm. The diaphragm divides the housing into a totally enclosed rear chamber wherein there is a powerful permanent magnet and a front chamber which serves as an acoustical impedance chamber and in which there is a driver port that is opposite the diaphragm and coaxial with it.

In each driver a coil is secured to the diaphragm, at its rear side. When the coil is energized with alternating current, it cooperates with the magnet to impart back and forth oscillations to the diaphragm that are in step with the alternations of the applied current.

The front chamber of the driver housing, which has a restricted outlet defined by the relatively small driver port, acoustically loads the diaphragm to limit the amplitude of its oscillatory excursions and thus prevents it from being overstressed. The driver port ordinarily opens into a further acoustical impedance chamber, which may comprise the narrow throat of an exponential horn. In the case of the apparatus of U.S. Pat. No. 4,796,009, the further impedance chamber is drum-like, the drivers are mounted around its periphery, and an exponential horn extends coaxially from one of its end walls or each of them. In the apparatus of U.S. Pat. No. 4,344,504 there is a horn for each driver and the several horns open into a common waveguide.

Heretofore the source of energizing current for such an electronic alerting and warning device has comprised a set of heavy-duty storage batteries that were connected through a suitable switch with an amplifier system. For siren-like tone emission the amplifier system was modulated by means of a tone generator of the desired frequency or frequencies. With the provision of suitable means comprising a microphone and a selector switch, the amplifier system could be voice modulated for delivery of spoken messages.

In the course of time there has been a virtual standardization of the drivers used with commercial electronic warning apparatus and of the amplifier systems used with those drivers. The typical driver is sold by Atlas Sound Company as its Model SA 370. It is duty rated at 100 W at 40 V and has an a.c. resistance of 11 ohms. The typical amplifier is made up of a number of modular amplifier units, each having a 200 W output to be capable of powering a pair of drivers that are connected to its output in parallel. As installed in prior apparatus, the several amplifier modules have had their power and modulation inputs connected in parallel, but each module has had its output connected only with an associated pair of drivers, so that a relatively large number of wires had to extend between the amplifier system, which is usually at or near ground level, and the drivers, which are usually mounted on a high mast or other elevated support. Such modular amplifier systems have come into widespread commercial use in electronic warning devices because they are readily available, are known to be reliable, and are versatile because they can be readily assembled into warning devices comprising any desired even number of drivers.

The present invention resides in substantial part in the recognition of serious disadvantages inherent in the heretofore conventional means for energizing the drivers to produce tone signals, comprising storage batteries, a tone generator and amplifier modules. The underlying factor is that the conventional amplifier module cannot be modulated for a full power sine-wave output, since this would require its transistors to provide a substantial amount of resistance during a major portion of each sine-wave cycle, causing current to be converted to heat energy at such a rate as to overheat the module and destroy it. The tone generator therefore imposes a square-wave modulation on the amplifier modules, each of which accordingly delivers a square-wave output to its associated drivers. Since the square-wave amplifier output is always either all current and no voltage or no current and all voltage, there is no substantial heating of the amplifier modules.

However, the application of this square-wave a.c. energization to the drivers has been the cause of heretofore unrecognized problems and inefficiencies. When a driver is energized with an a.c. of square-wave form, each cycle of that current tends to propel the diaphragm of the driver first in one direction at maximum force and then in the opposite direction at maximum force, with an instantaneous force reversal at each change in phase. In effect, the square-wave current seeks to impose upon the diaphragm an infinite acceleration first in one direction and then in the other, jerking it abruptly back and forth, in contrast to the smooth and gradual accelerations that a sine-wave current tends to produce.

The high and abrupt accelerations of the diaphragm that result from square-wave current energization are obviously stressful and have the effect of shortening its useful life. In fact, failure of drivers is not uncommon, and each of the commercial amplifier modules has a signal light that warns when one of its associated drivers has failed.

Another and very important disadvantage of energizing a driver with a square-wave a.c. is that the driver produces a relatively poor acoustic output. For one thing, the power applied to the driver must be substantially lower than would be feasible with sine-wave energization, to avoid overheating of the driver coil as well as mechanical overstressing of the diaphragm. The driver coil has a high impedance to a square-wave alternating current, inasmuch as a square wave can be regarded as a sine wave of the same frequency that has all of its harmonics added to it, to thus constitute the equivalent of a very high frequency, and the impedance of the driver coil is linearly proportional to the frequency of the a.c. applied to it. In addition, the inherently inefficient abrupt acceleration forces that square-wave energization imposes upon the diaphragm reduce the acoustic output of the driver to a value substantially below what it would be if the same input power were applied to the driver in sine-wave form.

Apparently these inefficiencies of the prior energizing means have not heretofore been understood or appreciated, probably because there was no evident need for thinking about them. Any desired acoustical output could be obtained by simply using as many drivers as were needed for that output, using the number of amplifier modules appropriate for that number of drivers, and using enough batteries to power the apparatus.

But a high-powered warning device is expensive when it is designed to produce a given acoustical output while accommodating the unrecognized inefficiencies. Obviously it is more costly by reason of its having more drivers, amplifier modules and batteries than are truly needed. In apparatus having a horn for every driver, as in the widely used arrangement disclosed in U.S. Pat. No. 4,344,504, there is the further very substantial cost of an increased number of horns to accommodate the increased number of drivers. In turn, each additional horn increases the bulk of the acoustic apparatus, subjecting it to increased wind loads as well as increasing its weight, thus requiring that it be mounted on a sturdier and more expensive mast.

The market for public alerting and warning devices is a highly competitive one. Most installations of such apparatus are contracted for on the basis of bids. The advertisements for such bids usually lay down rigid performance specifications, and therefore price is the principal criterion upon which contracts are awarded. The competitive pressure for lower prices is in itself evidence of the unboviousness of the present invention, for if there had been any obvious method or means for achieving a substantial reduction in cost of such devices commercial necessity would surely have compelled skill in the art to seize upon that expedient.

SUMMARY OF THE INVENTION

The general object of this invention is to effect a substantial reduction in the cost of high-powered electronic outdoor alerting and warning apparatus that produces tone outputs.

A more specific object of the invention is to reduce the cost of such equipment by providing energizing means for direct and efficient energization of the drivers, permitting elimination of the expensive amplifier modules that have heretofore been conventional, enabling a given acoustic output to be produced with fewer drivers than have heretofore been needed, and correspondingly reducing the weight and bulk of the acoustic apparatus and the cost of the structure needed for supporting it.

Another specific object of the invention is to provide inexpensive means in apparatus of the character described for applying to its drivers an alternating current of sine-wave form that enables the drivers to operate more efficiently, at a higher output capacity, and with a longer useful life than has heretofore been possible.

It is also a specific object of the invention to provide, in an electronic warning device that produces a tone output, means for efficient energization of the drivers that can be operated from any desired primary energy energy source such as a storage battery, an internal combustion engine or electric utility supply mains.

A further specific object of the invention is to reduce the complexity of alerting and warning apparatus of the character described, to thereby simplify and reduce the cost of manufacturing it, assembling it at the installation site and repairing it.

These and other objects of the invention that will appear as the description proceeds are achieved with the present invention, which provides energizing means for causing an electronic alerting and warning device to produce a high-volume tone output. Such a device comprises a plurality of substantially identical electromagnetic drivers for converting electrical energy to acoustical energy, each such driver comprising a diaphragm and an electrically energizable coil for imparting audio frequency vibrations to the diaphragm. The energizing means of this invention is characterized by a rotary alternator that is drivable at a predetermined rotational speed for producing an alternating current which is of substantially sine-wave form and which has a predetermined audio frequency. The energizing means also comprises powered means for rotatably driving the rotary alternator at said predetermined rotational speed and conductor means connecting the rotary alternator with the coils of the drivers for energization of the coils with said alternating current.

Other characterizing features of preferred embodiments of the invention will appear from the following description.

BRIEF DESCRIPTION OF THE DRAWINGS

In the accompanying drawings, which illustrate what are now regarded as preferred embodiments of the invention.

DETAILED DESCRIPTION OF PREFERRED EMBODIMENTS OF THE INVENTION

Figure 1:
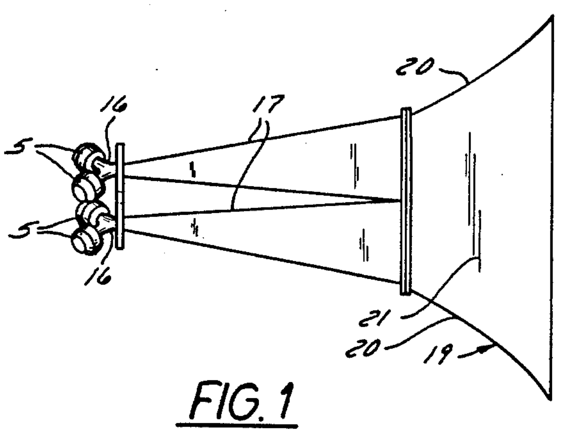
FIG. 1 is a plan view of a high-powered electronic alerting and warning device with which the energizing means of this invention cooperates.
Figure 4:
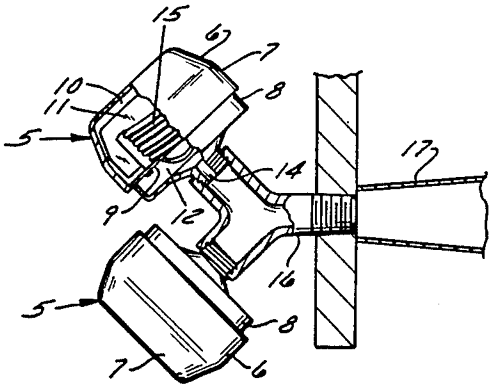
FIG. 4 is a fragmentary view through the device shown in FIG. 1, substantially in horizontal section, illustrating details of a pair of drivers and their connection with the throat of a horn.
Figure 2:
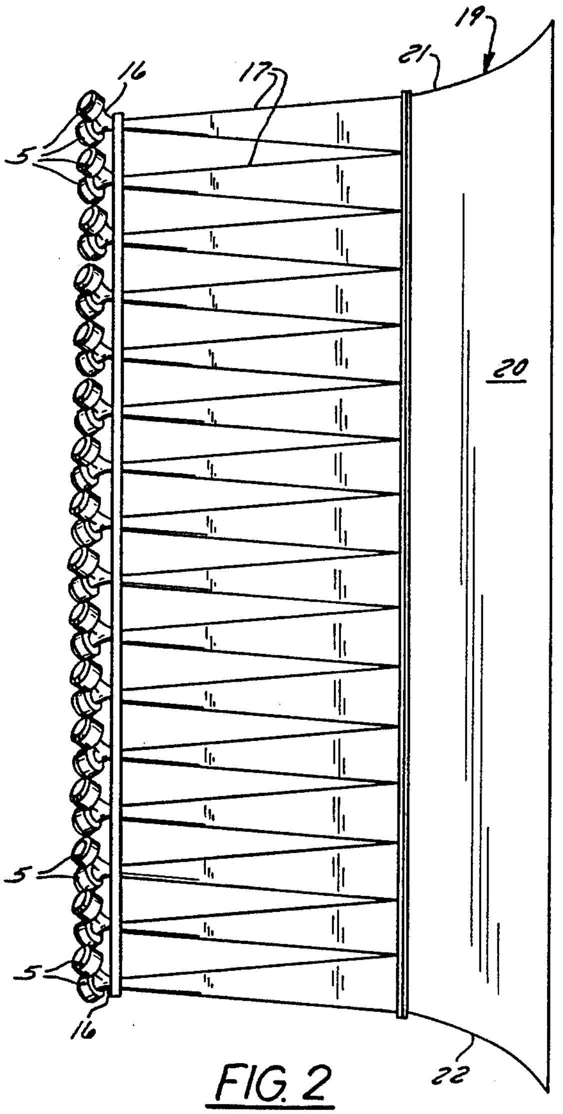
FIG. 2 is a view in side elevation of the device shown in FIG. 1.
Figure 3:
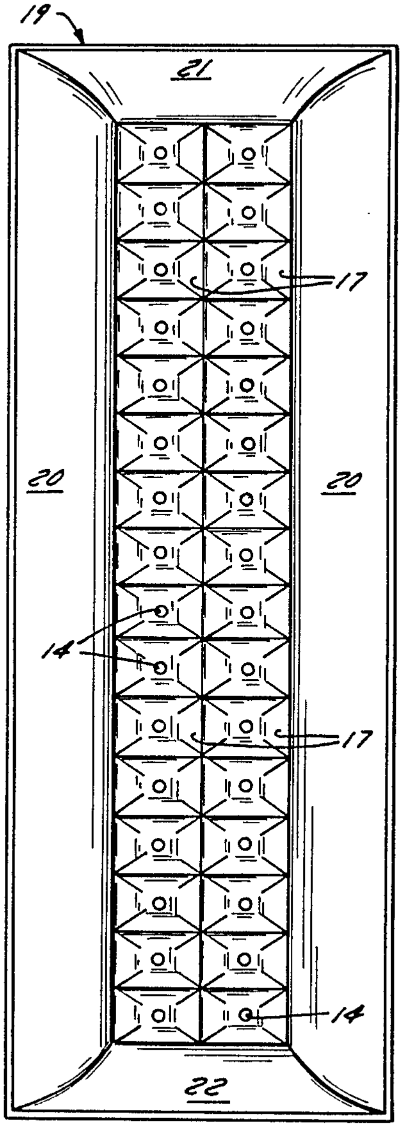
FIG. 3 is a view in front elevation of the device shown in FIG. 1.

A high-powered electronic alerting and warning device with which the energizing means of the present invention cooperates comprises a plurality of electromagnetic drivers or transducers 5 whereby electrical energy is converted into acoustical energy. Conventionally such a device has had an even number of such drivers 5 because each of the amplifier modules (not shown) through which the drivers were energized has been adapted for connection with two drivers; but no amplifier is needed for tone generation with the energizing means of this invention, and therefore the invention permits any desired number of drivers 5 to be incorporated in the device, although an even number of them will usually be preferred.

Each driver 5 can be conventional, of a type exemplified by the above mentioned Atlas Model SA 370. Such a driver comprises, in general, a rigid housing 6 consisting of substantially dome-shaped front and rear castings 7 and 8 that are coaxially secured to one another in clamping relationship to the rim of a diaphragm 9. The diaphragm 9 thus divides the interior of the housing 6 into a totally enclosed rear chamber 10 in which a permanent magnet 11 is fixed and a front chamber 12 in which there is a concentric driver port 14 that is opposite the diaphragm. In the rear chamber 10 there is a coil 15 that is secured to the rear side of the diaphragm. As is well known, the coil 15, when energized with an alternating current, cooperates with the magnet 11 to actuate the diaphragm 9 in back and forth vibrations that are in step with the alternations of the current.

The front chamber 12 of the driver housing 6, with its relatively small driver port 14, provides for acoustic loading of the diaphragm. In the alerting and warning device the drivers are so mounted that each has its driver port 14 opening into a further acoustical chamber, as explained above.

The present invention accommodates installation of the drivers in any efficient arrangement, including those of U.S. Pat. Nos. 4,344,504 and 4,796,009 as well as others that may be found satisfactory. In the present case, for purposes of illustration, the drivers 5 are mounted in pairs, each pair on a Y-fitting 16 that conducts their outputs into the throat of an exponential horn 17. This arrangement, whereby two drivers in effect share one horn, causes a small loss in efficiency as compared with the conventional one-horn-per-driver arrangement; but it is cost effective in requiring substantially fewer horns for a given sound energy output, and the decrease in efficiency due to horn sharing is more than offset by the increased efficiency of drivers energized in accordance with the present invention.

As here shown, there are two like sets of horns 17, the horns of each set being vertically aligned with one another and the two sets being so arranged that each horn of one set is in close side-by-side relationship to a horn of the other set. The horns of each set have their axes substantially parallel to one another and contained in a common vertical plane, but the horns of each set have their axes forwardly divergent at a small angle to the axes of those of the other set. Both sets of horns have their mouths opening into a common wave guide 19 that is substantially rectangular as viewed from its front or its rear and has flared side walls 20 and top and bottom walls 21 and 22. The horns and wave guide cooperate to deliver a high volume output as a horizontally concentrated beam which has relatively little vertical dispersion.

The energizing means of the present invention is characterized by a rotary alternator 24 that produces an alternating current which is of sine-wave form and which is directly applied to the drivers 5 without need for amplification. For most alerting and warning purposes a community warning device desirably produces a tone output that is normally within the 400 Hz to 800 Hz frequency range. However, for a wailing tone output that rises and falls in pitch, the highest pitch must be within the 400–8OO Hz frequency range but the lowest pitch can have a frequency which is one-half that of the highest pitch and can thus be as low as 200 Hz.

Figure 5:
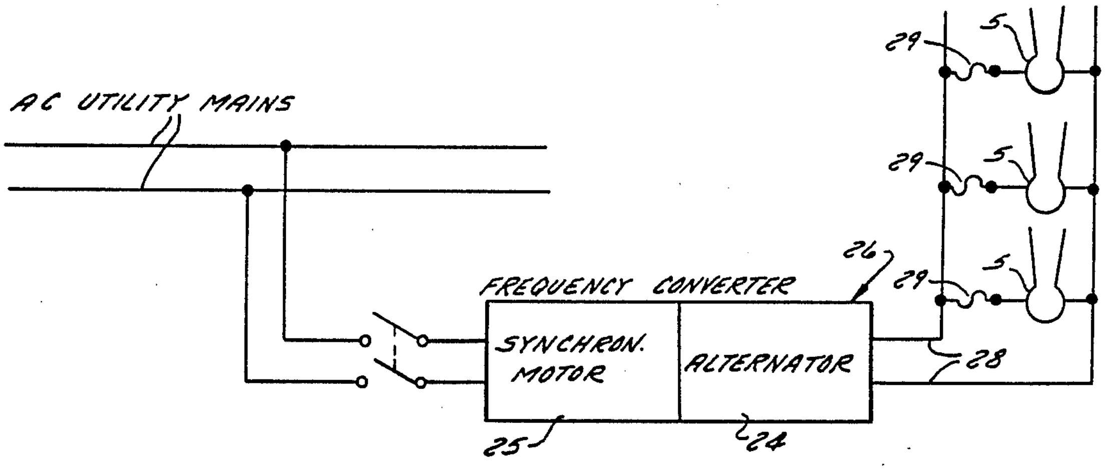
FIG. 5 is a diagrammatic illustration of an embodiment of energizing means of this invention that comprises a commercially available motor-generator set or rotary frequency converter.

It will be seen that the monotone frequency requirement can be met if the alternator 24 comprises the output unit of a motor-generator set 26 of commercial type, capable of producing a 400 Hz alternating current and normally used for certain aircraft applications and military purposes. Typical of such equipment is the "Power-Plus MD-2" motor-generator set or frequency converter that is made and sold by Kurz & Root Company of Appleton, Wis. It comprises a synchronous a.c. motor 25 and a brushless alternator 24 that share a common frame and a common shaft. It requires a 60 Hz 220 or 440 volt input, and it produces a 400 Hz single-phase sine-wave output rated at 10 kW at a selectably variable voltage of 46 V to 76 V. Such a frequency converter is of course particularly suitable where utility electrical power mains can serve as the source of primary energy for a community warning device, as illustrated in FIG. 5, but it could alternatively be powered from an engine-driven standby alternator (not shown) that produces a 60 Hz a.c. output suitable for powering it.

When conventional amplifier modules are used, a 40 V square-wave a.c. is normally applied to the coil 15 of each driver, but the coil can be safely and efficiently energized with a sine-wave a.c. of substantially higher voltage —probably as high as 60 V. Since the output voltage of the above described frequency converter is controllably variable to be safe and effective for direct connection across the coil 15 of every driver, the drivers can be connected with the output terminals of the frequency converter in parallel with one another, as shown in FIG. 5. Thus only two conductors 2S need extend between the energizing means and the acoustical apparatus comprising the drivers, in contrast to the numerous conductors needed for connecting drivers with a heretofore conventional modular amplifier. Preferably a fuse 29 is connected in series with each driver.

Even at the low end of the power range (about 5 KW and upwards) in which electronic warning devices are less expensive than electromechanical sirens, the cost of a suitable rotary frequency converter tends to be lower than the cost of a comparable modular amplifier. With increasing power within that range, the cost of a modular amplifier increases linearly with power, whereas the cost of a rotary frequency converter increases much less than proportionally to its power output. In addition to this lower first cost, the frequency converter is inherently sturdier. It is almost impervious to lightning damage, whereas amplifier modules ar very vulnerable to lightning strikes—an important consideration in connection with alerting devices used for tornado warnings.

The rate at which sound energy dissipates in free air is in an inverse ratio to its frequency, and therefore a 400 Hz tone can be heard at a greater distance than an 800 Hz tone generated with the same amount of power. However, the lower frequency tone, being less annoying, is less effective for warning purposes. The preferred frequency for a monotone warning signal is therefore in the range of 600–800 Hz.

Although commercially available frequency converters usually produce a 400 Hz a.c. output, they can be readily modified to produce an output of another frequency within the 400–800 Hz range. This can be done by winding the alternator element to provide it with a larger number of poles. Another expedient is to energize the exciter windings of the alternator with an alternating current of suitable frequency instead of with the d.c. that is conventionally applied to it. Indeed, such a.c. energization of the exciter windings offers the possibility of impressing upon the exciter windings voice frequencies that would modulate the a.c. output of the alternator and thus enable the delivery of spoken messages from the acoustical apparatus.

Figure 6:
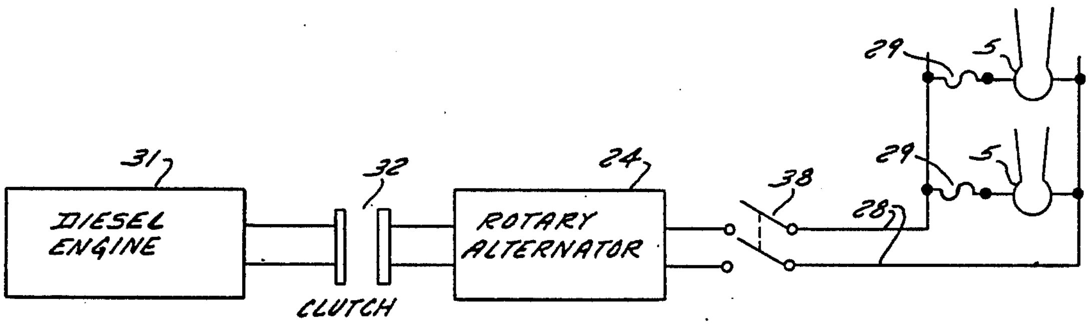
FIG. 6 diagrammatically illustrates another embodiment of the energizing means of this invention, wherein an internal combustion engine comprises the powered means that constitutes a primary power source for the apparatus.

As illustrated in FIG. 6, energizing means of the present invention can comprise a self-contained rotary alternator 24 that produces a sine-wave a.c. output of the desired frequency when driven at a predetermined rotational speed, an internal combustion engine 31 that serves as the powered means for driving the alternator 24, and a clutch 32 through which the engine 31 drives the alternator. The powered means 31 is preferably a diesel engine. The clutch 32 is preferably a centrifugal clutch, t be disengaged when the engine is being started and to engage as engine speed increases above the idle range. When the engine runs at full speed with the clutch 32 engaged, the apparatus produces monotone signal. For a wailing signal the engine throttle is activated for alternate increase and decrease of engine speed, so that the output frequency of the alternator 24 regularly rises and falls with the increasing and decreasing rotational speeds at which the alternator is driven.

Figure 7:
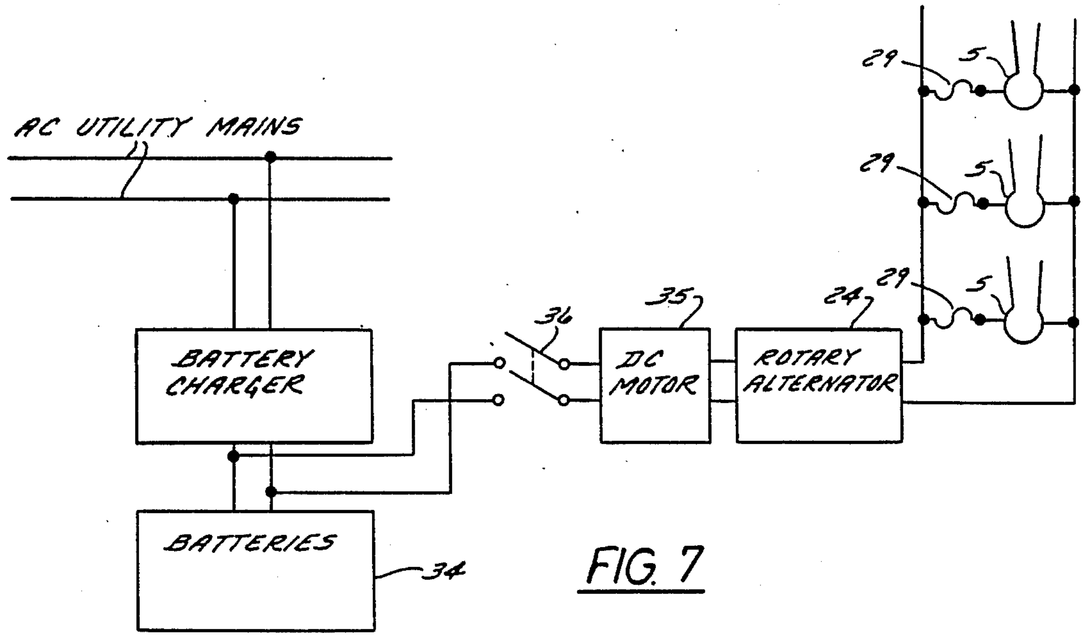
FIG. 7 diagrammatically illustrates still another embodiment wherein storage batteries constitute the primary power source.

With storage batteries 34 as the primary energizing source for the apparatus, as illustrated in FIG. 7, the powered means for the alternator can comprise a d.c. motor 35 that is permanently coupled to the alternator and is energizable from the batteries through a switch 36. For a wailing output, the switch 36 is opened and closed in a regular cycle.

A further possibility for producing distinctive tone outputs signifying particular danger conditions is to connect a switch 38 with one or both of the conductors 28 that carry the alternator output to the drivers, as shown in FIG. 6. With this switch 38 in its normally closed condition, the apparatus would produce a steady monotone output, whereas alternate opening and closing of the switch would produce an intermittent or "beeping" tone output.

Combinations of the above described signal varying arrangements, to produce other distinctive tone outputs, will be obvious to those familiar with this art.

From the foregoing description taken with the accompanying drawings it will be apparent that this invention provides low cost energizing means for a high-powered alerting and warning device of the type comprising electromagnetic drivers, said energizing means being not only substantially less expensive than prior equipment having an equivalent power output but also being sturdier, more reliable, less subject to lightning damage, and easier to install.

What is claimed is:

1. An electronic alerting and warning device for converting at least 5 kW of electrical power to a high volume sound output, comprising, in combination:

A. a number of substantially identical electromagnetic drivers for converting electrical energy to acoustical energy, each said driver comprising:
  (1) a diaphragm having front and rear sides,
  (2) a rigid housing across which said diaphragm extends and which cooperates with the diaphragm to define
    (a) at the rear side thereof a totally enclosed rear chamber and
    (b) at the front side thereof a front chamber wherein there is a driver port that provides for acoustic loading of the diaphragm,
  (3) a permanent magnet fixed in said rear chamber, and
  (4) a coil fixed to said rear side of the diaphragm and capable of being duty energized with a power on the order of 100 W by an a.c. that impresses on the order of 40 V across the coil, said number of drivers being such that the coils of all of said drivers can, together, consume said at least 5 kW of power;
B. a rotary alternator which, when driven at a predetermined rotational speed, produces an alternating current
  (1) of substantially sine-wave form
  (2) having a frequency within the range of about 200 HZ to about 800 HZ and
  (3) having a voltage on the order of 40 V;
C. conductor means connecting the coils of said drivers, in parallel with one another, with said rotary alternator; and
D. powered means for driving the rotary alternator at said predetermined rotational speed.

2. Energizing means for an electronic alternating and warning device for producing a high volume tone output, which device comprises a number of substantially identical electromagnetic drivers, each said driver comprising a rigid housing, a diaphragm extending across the interior of said housing to define therein a totally enclosed rear chamber wherein a permanent magnet is fixed and a front chamber in which there is a driver port that provides for acoustic loading of the diaphragm, and a coil fixed to the diaphragm in said rear chamber, said coil being capable of duty energization with a power of at least 100 W by an a.c. that impresses at least 40 V across the coil, the number of said drivers in the device being such that all of said drivers together consume at least about 5 kW, said energizing means comprising:

A. a rotary alternator drivable at a predetermined rotational speed for producing an alternating current which
  (1) is of substantially sine-wave form,
  (2) has a frequency within the range of about 200 HZ to about 800 HZ, and
  (3) has a voltage on the order of 40 V;
B. conductor means connecting said rotary alternator with the coils of the drivers, in parallel; and C. powered means for driving the rotary alternator at said predetermined rotational speed.

3. The energizing means of claim 2 wherein said powered means and said rotary alternator comprise a frequency-converting motor-generator unit that is energizable from alternating current utility supply mains.

4. The energizing means of claim 2, further characterized in that said powered means comprises an internal combustion engine.

5. The energizing means of claim 2, wherein said powered means comprises an electric motor drivingly coupled with the rotary alternator and a source of energizing current width which said motor is connectable, further characterized by:

an electric switch connected with said source of energizing current and with said motor and which can be closed for energizing the motor and opened to prevent its energization, said switch being intermittently closable to provide for intermittent energization of the motor whereby the rotational speed of the rotary alternator is varied and it is thus caused to produce an alternating current of correspondingly varying frequency.

* * * * *